3,047,680
PRE-TEST TEST CIRCUIT FOR A LINE
ROUTINER
David T. Robb, Rochester, N.Y., assignor to General Dynamics Corporation, Rochester, N.Y., a corporation of Delaware
Filed June 23, 1958, Ser. No. 743,783
10 Claims. (Cl. 179—175.2)

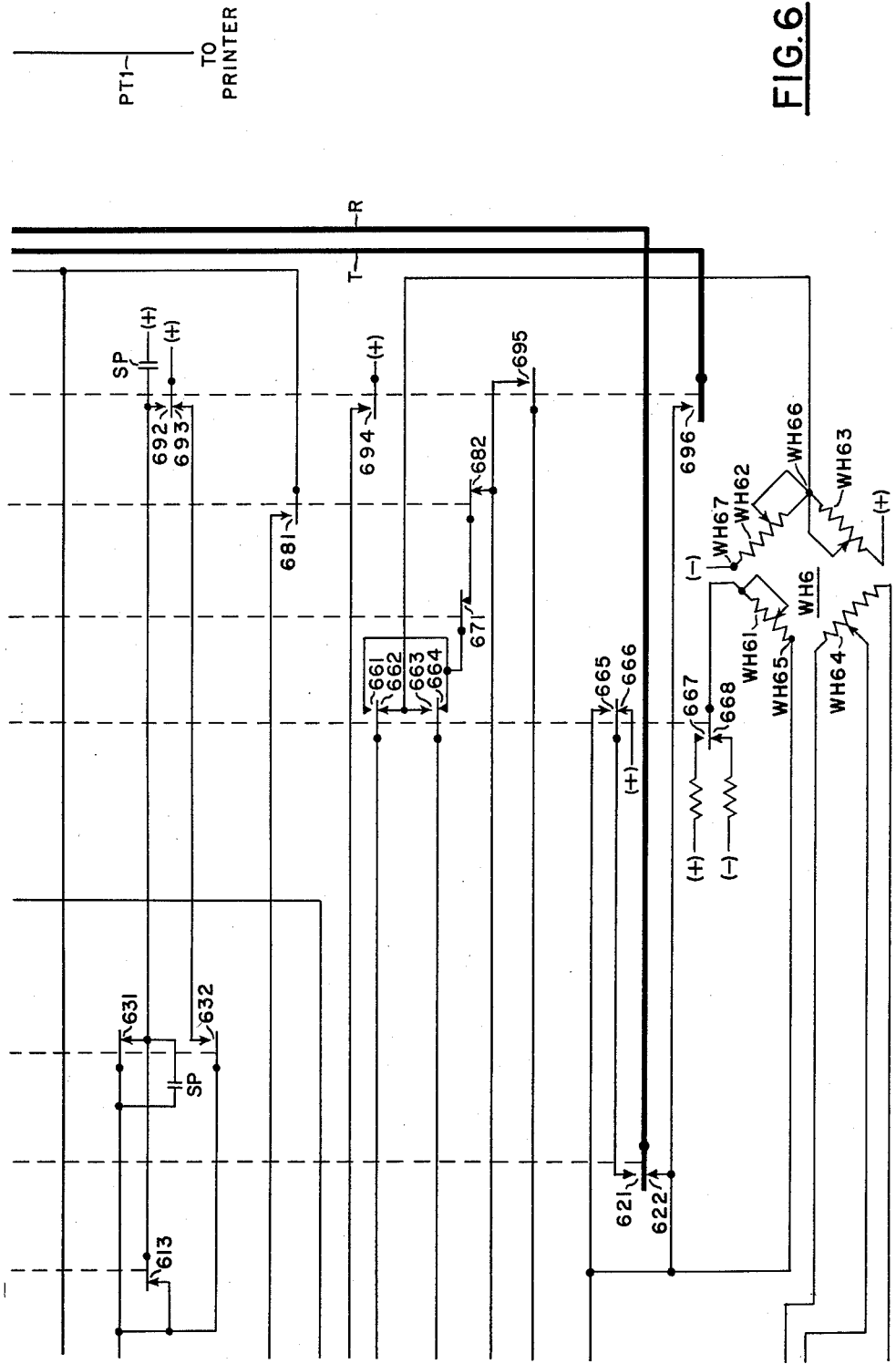

This invention relates to test circuits and more particularly to circuits for testing telephone subscriber lines.

Telephone systems may be arranged to extend calls between many subscriber lines, a typical exchange providing service for as many as ten thousand lines. Each subscriber line should be tested, usually at routine intervals, for various predictable faults such as short circuits and insulation faults that provide low resistance paths either to foreign battery or ground potentials. However, various difficulties have been experienced during such routine testing since the test circuits do not always distinguish between true faults and certain transitory conditions which may appear to be faults, or alternately the test reference may change during testing, resulting in an invalid record. Other problems may be caused by a need for testing lines at a rate of speed which is fast enough to test an entire office of ten thousand lines in a normal eight hour working day, or during periods of inclement weather when lines may be adversely affected by dampness or moisture ingress.

An object of this invention is to provide new and improved test circuits.

Another object of this invention is to provide for testing lines at different rates of speed depending upon the condition of a line under test.

Still another object of this invention is to provide for testing at different rates of speed depending upon whether ringers are coupled to subscriber lines via capacitors or tubes.

This invention accomplishes these and other objects by providing a balanced Wheatstone bridge which may be connected to subscriber line conductors. A magnetic amplifier is connected across the bridge circuit to detect currents resulting from unbalanced conditions which may selectively indicate either "fault" or "no-fault" conditions.

Normally, the sequence of tests is advanced immediately upon an indication by the magnetic amplifier that there is a "no-fault" condition. On the other hand, if a "fault" condition is indicated by the magnetic amplifier, a capacitor is allowed to discharge over a period of time during which a test is continued, thereby allowing a period for transitory conditions to subside or for the line to stabilize after its polarity is changed. At the end of this time delay period, the sequence of tests is advanced. Thus, the sequence of tests may be advanced at either of two rates of speed depending upon whether a test of a line indicates a "fault" or a "no-fault" condition.

On occasions, the balance between the arms of the Wheatstone bridge is so perfect that the magnetic amplifier is unable to detect any current flow, thereby indicating a "null" condition in which case another capacitor is allowed to discharge over an extended time delay period to enable the line to stabilize. If during this time delay the balanced condition of the Wheatstone bridge terminates, either a "fault" or "no-fault" condition may be indicated. On the other hand, if there still is no current flow (i.e., result of test indication), it means that the Wheatstone bridge is perfectly balanced and a "no-fault" condition exists.

Lines which are served by capacity coupled ringers are identified by special strappings so that tests may be delayed until such capacitors have stabilized.

Further objects and advantages of my invention may be understood by referring to the following description when taken in connection with the accompanying drawings in which:

FIGS. 1–6 illustrate a test circuit;

FIG. 8 illustrates the manner in which FIGS. 1–6 should be arranged to provide a complete and understandable circuit.

Figure 1:
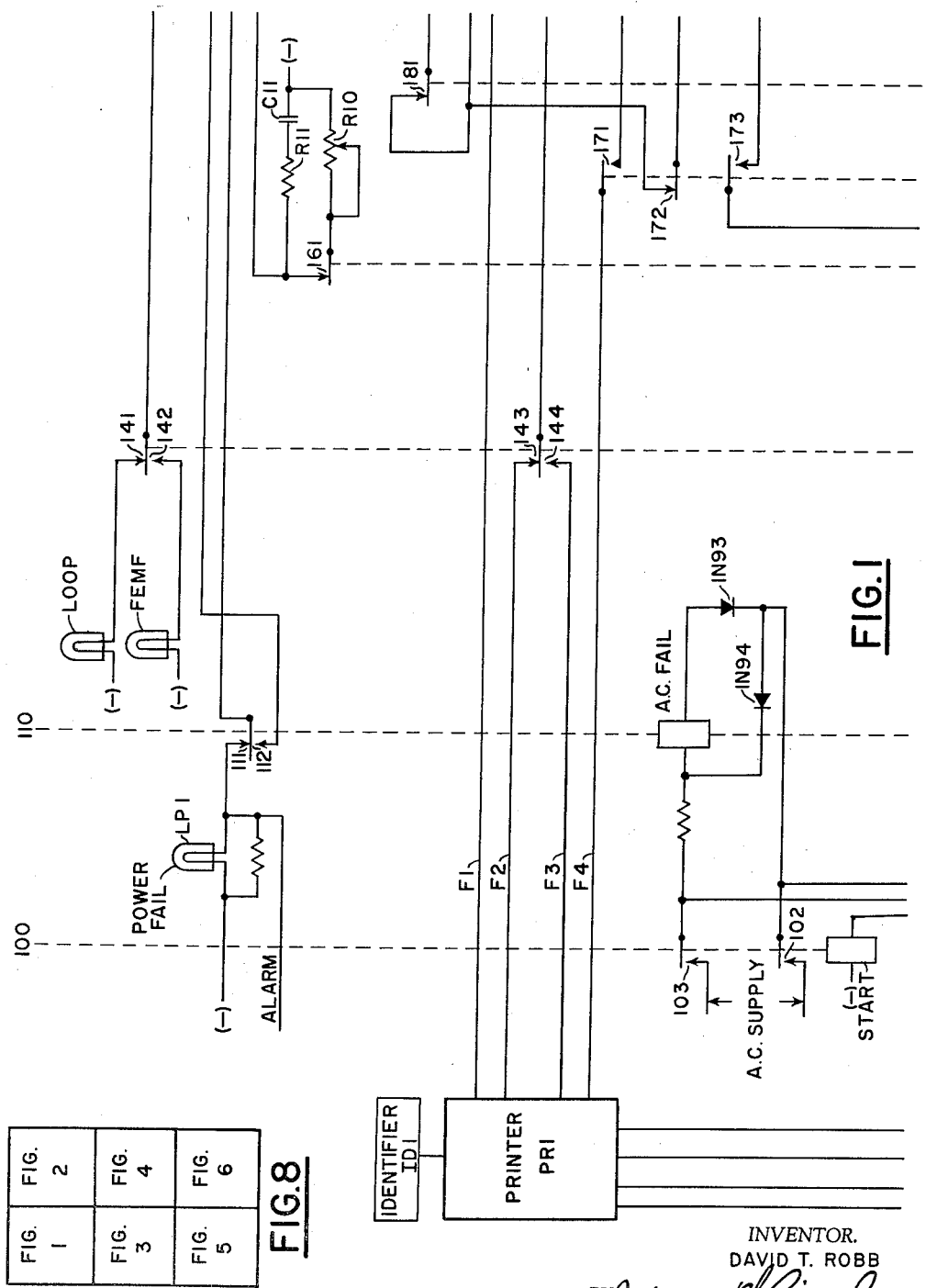
Figure 2:
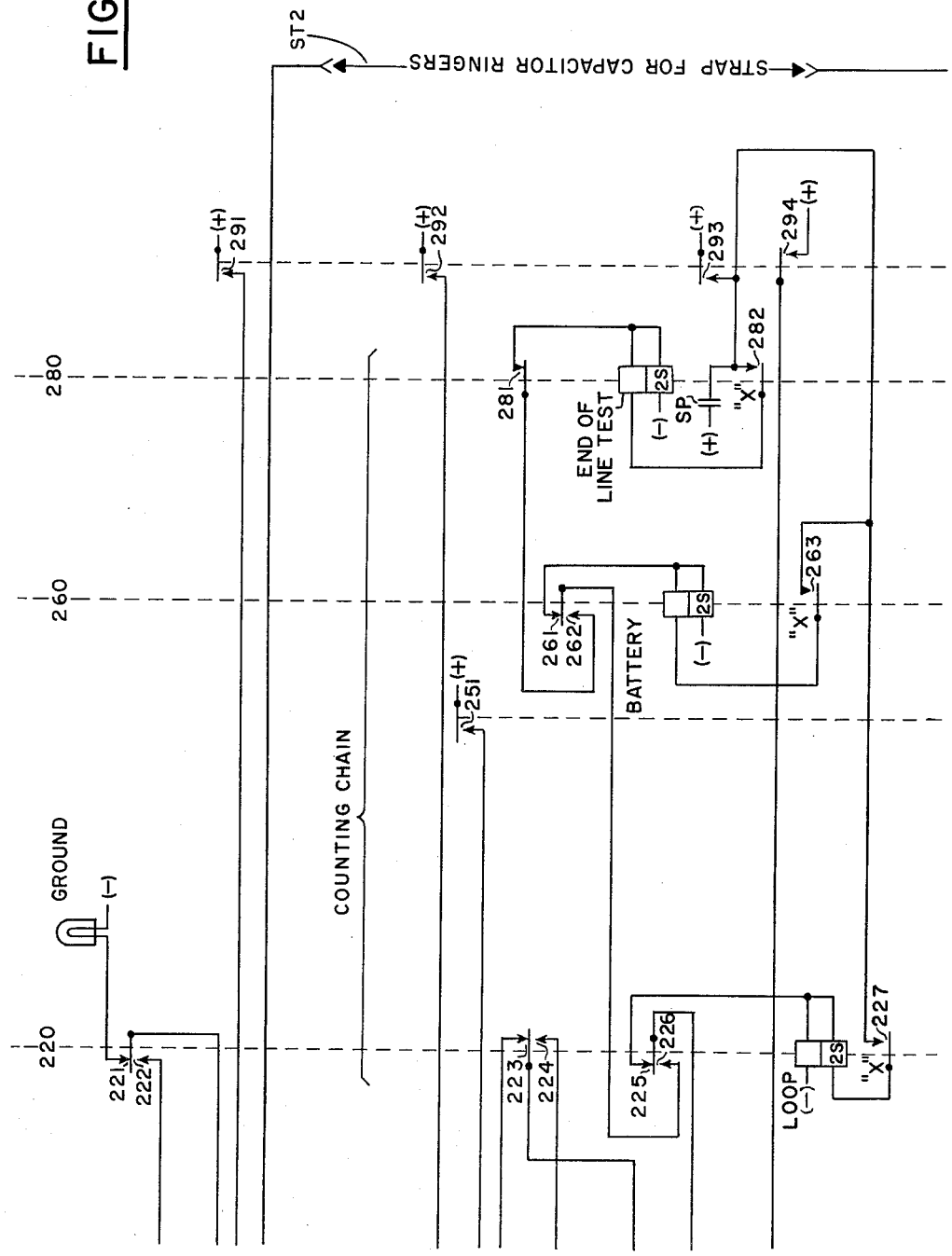

Simple and specific terms have been used wherever possible to facilitate an understanding of the invention; however, it should be understood that the use of such simple and specific terms is not to act in any manner as a disclaimer of the full range of equivalents which is normally given under established rules of patent law. To illustrate, the drawings show a magnetic amplifier connected across a Wheatstone bridge to detect unbalanced conditions. A galvanometer or other meter might readily be substituted for such magnetic amplifier. Further, the attached drawings show the source of office potential by means of (+) and (−) signs. As in most telephone systems, the (+) terminal is described as being connected to ground; however, it should be understood that either this or any other suitable power supply may be used. Quite obviously, other examples could be selected to illustrate the manner in which the specific terms that have been used are entitled to a wide range of equivalents.

At this point it may be well to define various terms and explain the nature of components that are referred to hereinafter. For example, the term "master ground" means a ground marking which is transmitted to seize and hold the test circuit of FIGS. 1–6. Magnetic amplifier MA3 (FIG. 3) is a standard commercial item that is provided with input windings which detect and amplify current flow, one suitable magnetic amplifier being known as "Sigma" 8205K2P, spec. 91832. When current induced in the output winding 3 flows in a first direction, contacts MA31 and MA32 operate and when current flows in the opposite direction, contacts MA33 and MA34 operate. Wheatstone bridge WH6 is a well-known circuit that may be used to detect unbalanced electrical conditions. The letters "SP" are used in the drawing to designate spark protecting devices.

The term "sequence of tests" indicates individual tests which may be conducted on a line, such as ground, battery and loop tests. The term "cycle of tests" means all tests, taken as a group, that are conducted on a line. As a specific illustration, a line may be seized whereupon a test cycle starts with a ground test, after which the sequence of tests advances, a loop test is made, the sequence advances again and a battery test is made to end a test cycle. Thereafter another line is seized and the cycle of tests is repeated in the same sequence. Obviously, other tests could be made or the sequence may be changed, as required.

The subject circuit may be used in connection with many devices. However, it may be desirable to refer particularly to copending application Serial No. 742,801, filed June 18, 1958, by E. H. Gatzert and W. W. Pharis, and assigned to the assignee of the subject invention, as an example of a line routiner which may include the subject circuit.

*Brief Description*

Figure 7:
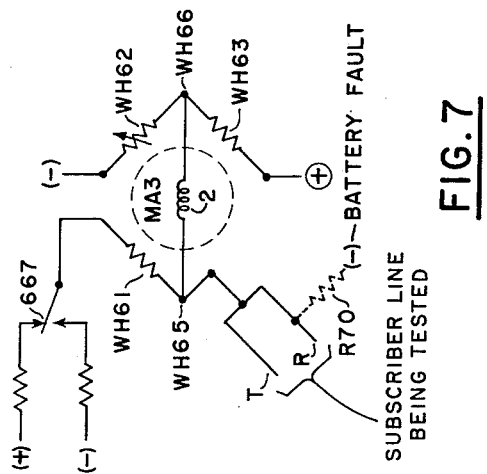
FIG. 7 is a simplified drawing of FIGS. 1–6 illustrating the manner in which the magnetic amplifier and Wheatstone bridge are connected.

FIG. 7 is a simplified drawing of FIGS. 1–6 designed to familiarize the reader with the basic concepts of the test circuit. Components which are common to FIG. 7 and FIGS. 1–6 have the same reference numerals. The battery fault connected via an insulation fault represented in the drawing by resistance R70 has been drawn to illustrate the subject; however, it should be obvious that other faults could also be shown.

Briefly, it is assumed that the potential marked "Battery Fault" in FIG. 7 is connected to conductor R of the "subscriber line being tested" via an insulation fault resistance R70. Resistors WH62 and WH63 form a voltage divider which may be adjusted to establish any predetermined potential at point WH66 such as (—)24 volts, for example. Resistors WH61 and R70 form a second voltage divider which establishes a potential at point WH65. That is, if resistance R70 is above a predetermined value, there is no serious fault, point WH65 is at a relatively low potential, such as (—)5 volts, for example, and current flows in a first direction in winding 2 of magnetic amplifier MA3, thereby indicating a "no-fault" condition. If resistance R70 is below a predetermined value, there is a serious "fault," point WH65 is at a relatively high potential, such as (—)40 volts, for example, and current flows through winding 2 in magnetic amplifier 3 in a direction which is opposite to the first direction, thereby indicating a "fault" condition. If conditions are such that points WH65 and WH66 are at the same potential, a "null" condition exists and no current flows through winding 2 of magnetic amplifier MA3.

Figure 3:
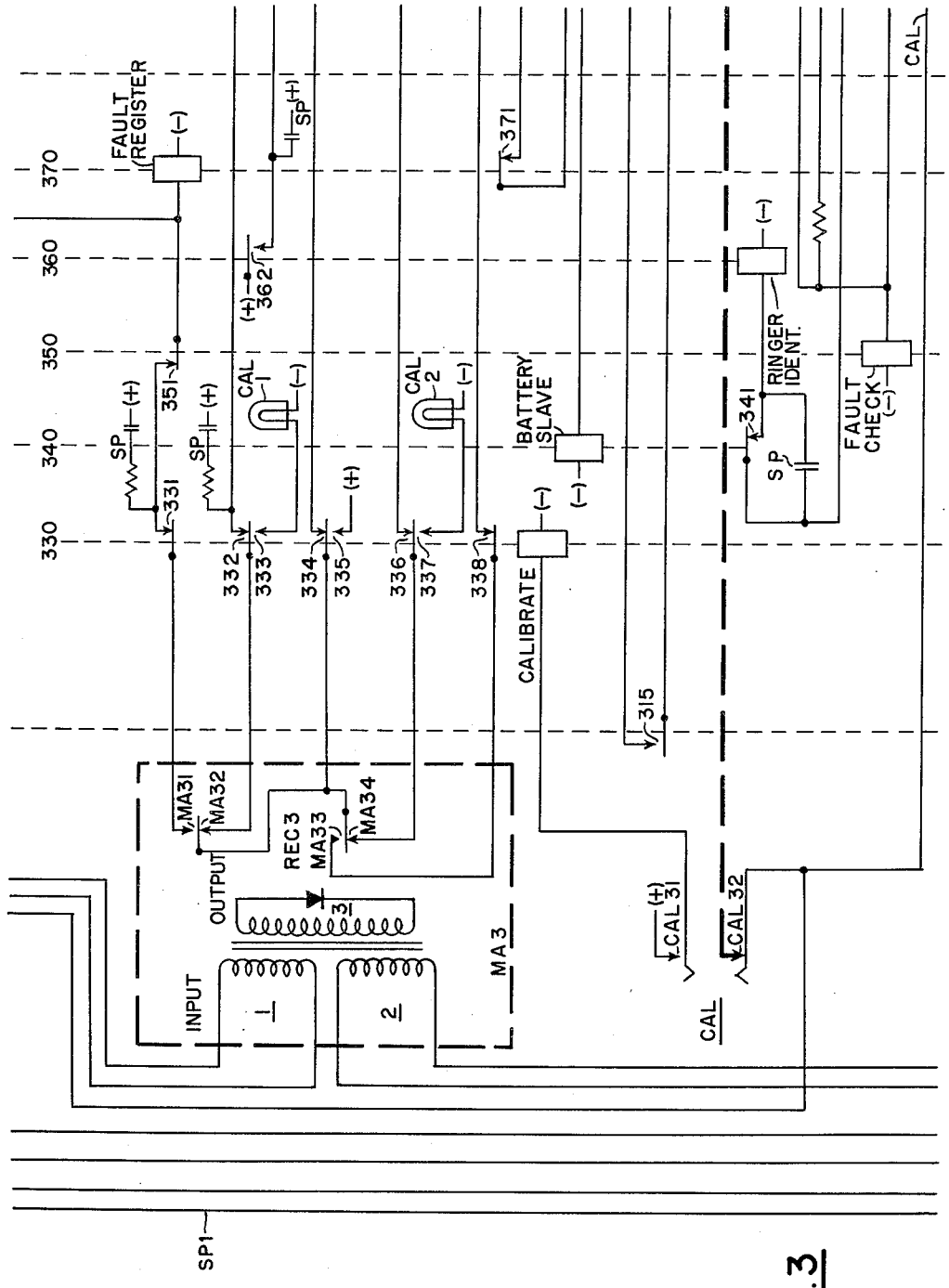
Figure 4:
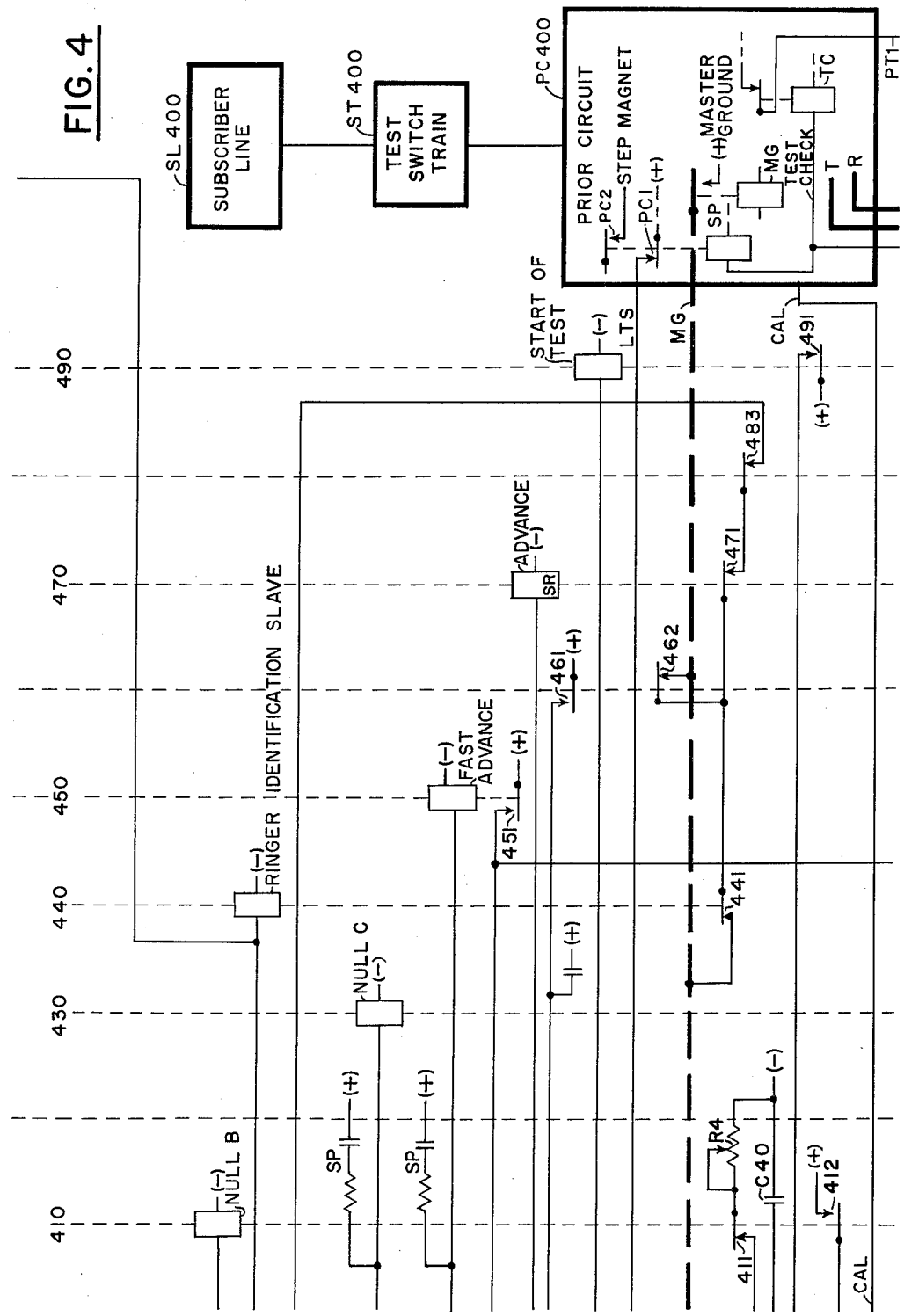
Figure 5:
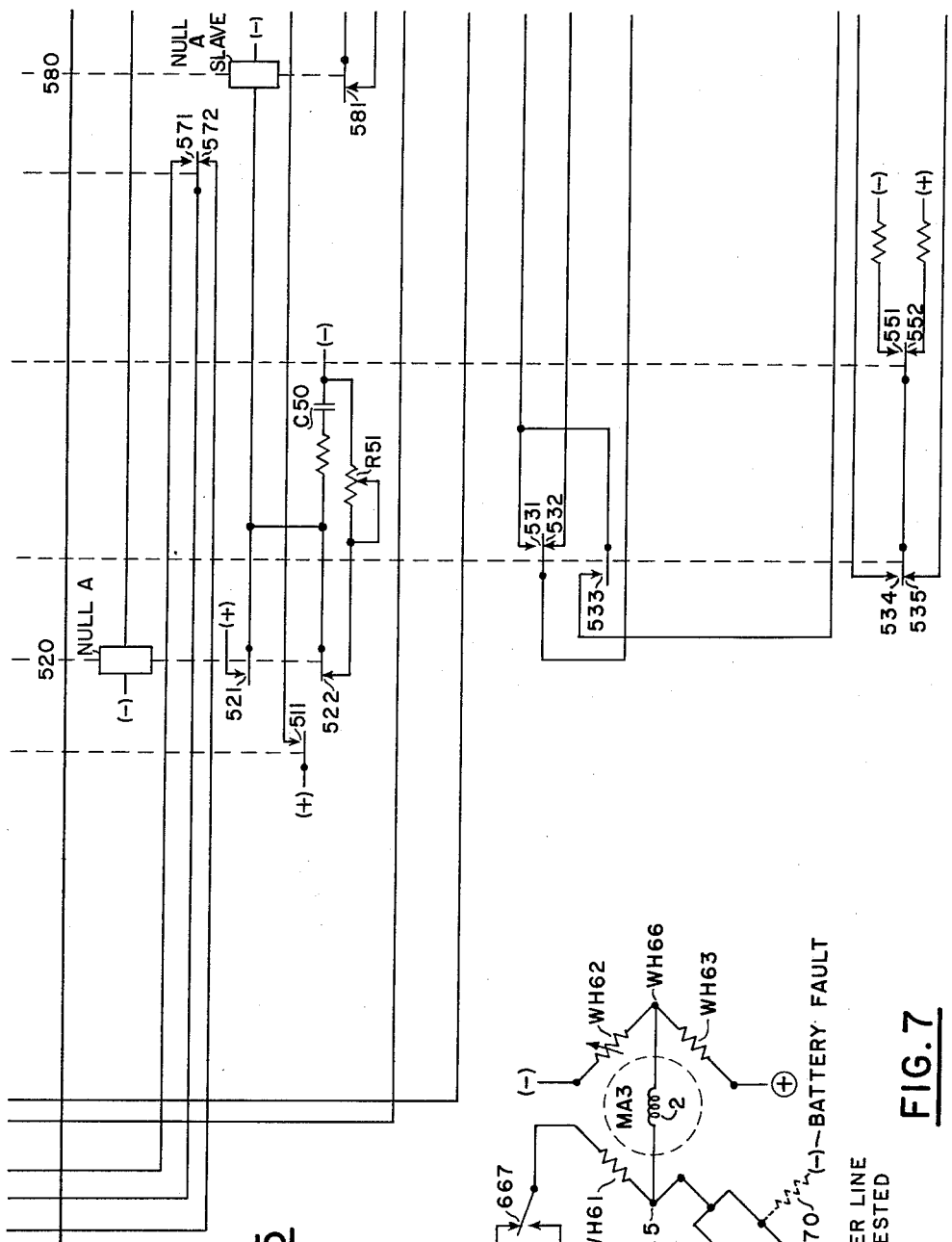

Referring to FIG. 3, winding 2 of magnetic amplifier MA2 is the same as winding 2 of FIG. 7. If it is assumed that the current in winding 2 is in a direction that indicates "no-fault," contacts MA33 and MA34 operate, fast advance relay 450 operates, and the test circuit is advanced at a high rate of speed to make the next test. On the other hand, if it is assumed that the current in winding 2 is in a direction that indicates a "fault," contacts MA31 and MA32 operate, "fault" register relay 370 operates after a time delay period introduced by discharging current from capacitor C40 and the printer makes a record of the fault. If there is a "null" condition, no current flows in winding 2, contacts MA31–MA34 do not operate, and a time delay is introduced by discharging current from capacitor C50 to allow the "null" condition to subside if it is going to subside.

*Detailed Description*

*Seizure.*—The test circuit of FIGS. 1–6 is seized when any suitable means, such as relay MG in prior circuit PC400 (see FIG. 4) applies a master ground marking to conductor "MG" (shown by a heavily inked dotted line). Responsive thereto, start relay 100 operates over a circuit including contacts CAL32 to connect any suitable source of alternating current to winding 1 of magnetic amplifier MA3 and to operate A.C. fail relay 110. Relay MG also completes a circuit to operate null B relay 410 as follows: (—) battery, the winding of relay 410, contacts 332, MA32, 334, 483, 471, 441 and 462 in parallel, and conductor "MG" to master ground. Null C relay 430 operates over a circuit which may be traced from (—) battery through the winding of relay 430, contacts 336, MA34, 334, 483, 471, 441 and 462 in parallel, and conductor "MG" to master ground.

Responsive to the operation of A.C. fail relay 110, contacts 111 open to disconnect power failure lamp LP1 and to prepare circuits for the lamps designated "Loop," "FEMF" and "Ground"; however, none light since contacts 291 are now open. Contacts 315 and 511 have no effect at this time since contacts PC1 and 681 are open.

Responsive to the operation of null B relay 410, contacts 411 open to break a circuit which is in shunt with capacitor C40, a device used later during the test cycle to provide a delay in the advance of the test sequence if a possible "fault" condition is indicated. Contacts 412 close to operate fault check relay 350 and charge capacitor C40, both functions being completed over obvious circuits. Contacts 613 open to break one of the incomplete control paths for null A relay 520.

Responsive to the operation of null C relay 430, contacts 631 open to break another of the incomplete control paths for null A relay 520; however, contacts 632 close to operate null A relay 520 over the circuit extending from (—) battery through the winding of relay 520, operated contacts 632 and test contacts 693 to ground (+).

Responsive to the operation of fault check relay 350, contacts 351 open to break an incomplete control circuit to unoperated fault register relay 370, there being no effect at this time.

Responsive to the operation of null A relay 520, contacts 522 open to break a circuit in shunt with capacitor C50, a device which is used later during the test cycle to provide a time delay if a "null" condition is indicated. Contacts 521 close to operate null A slave relay 580, and to charge capacitor C50, both functions being completed over obvious circuits.

Responsive to the operation of null A slave relay 580, contacts 181 and 581 open, there being no effect at this time.

The circuit is now ready to perform a cycle of tests and nothing further happens at this time, relays MG, 100, 110, 350, 410, 430, 520, 580 being operated.

*Seizure of line under test.*—Any suitable means may be provided to connect each subscriber line in its turn to the test circuit of FIGS. 1–6. It is assumed for the purposes of this description that switch train ST400 has connected conductors T and R (FIG. 6) through circuit PC400, to an individual subscriber line SL400. Upon successful completion of such connection, prior circuit PC400 extends a ground (+) marking over a circuit including contacts PC1 by any suitable means (not shown) and applies ground (+) potential to conductor LTS, thereby operating start of test relay 490 over a circuit including contacts 315.

*Start of test.*—Relay 490 operates to initiate a cycle of tests on subscriber line SL400. Responsive thereto contacts 696 close to connect Wheatstone bridge WH6 to the heavily inked talking conductors T and R (in parallel), the circuit extending from (—) battery through rest contact 668, resistor WH61, point WH65 and contacts 622 and 696 to conductors T and R, respectively. Contacts 695 close to connect magnetic amplifier MA3 to Wheatstone bridge WH6 over a circuit which may be traced from (—) battery through contacts 668, resistance WH61, point WH65, contacts 532, 695, 682, 671, 664, input coil 2 of magnetic amplifier MA3, contacts 662, point WH66 and resistance WH63 to ground (+). Contacts 694 close; however, contacts 581 are now standing open so that there is no effect at this time. Contacts 693 open, thus restoring null A relay 520 which was being held over a circuit including contacts 632. Contacts 692 close but have no effect since contacts 631 and 613 are now open. Contacts 491 close to operate ringer identification relay 360 over a circuit that may be traced from (—) battery through the winding of relay 360, resting contacts 341 and operating contacts 491 to ground (+). Contacts 294 close to prepare a locking circuit for fault register relay 370; however, contacts 173 are now standing open so there is no effect. Contacts 293 close to prepare a holding circuit for a chain of counting relays 220, 260 and 280. Contacts 292 have no effect at this time. The lamp designated "Ground" is lit as an indication that a line is being tested for a ground fault when contacts 291 close the circuit which may be traced from (—) battery through the filament of the lamp, contacts 221, 112 and 291 to ground (+).

It might be well to explain briefly at this point that ringers may be used which are connected to subscriber lines either via a tube or via a capacitor. If the connection is via a capacitor, the line may have a residual charge stored thereon which presents an unstable condition if the line is tested immediately after seizure; therefore, it may be desirable to provide a time delay after seizure and before the test to permit stabilization. On the other hand, if the ringer is connected via a tube, there is neither a stored charge nor a need to provide such a time delay. Means is provided for testing in either case, i.e., an optional strapping ST2 may interconnect relay 440 and contacts 161 so that capacitor C11 may be charged to provide a time delay period when lines having capacity coupled ringers are tested. Omission of strap ST2 eliminates the time delay period when tube coupled ringers are used.

In greater detail, responsive to the operation of relay 360, an obvious circuit is completed at contact 362 for operating ringer identification slave relay 440. Contacts 161 open to remove a shunt from around capacitor C11, thereby completing a charging circuit which extends from (−) battery through capacitor C11, resistance R11, strap ST2 (if provided), and contact 362 to ground (+). The effect of capacitor C11 is to make relay 440 into a slow release relay.

Contacts 441 open responsive to the operation of relay 440; however, it should be noted that master ground continues to be applied over the circuit via contacts 462, 471, 483 and 334.

Null A relay 520 restores when contacts 693 open as explained above. Responsive thereto, contacts 521 open and capacitor C50 discharges through the winding of null A slave relay 580, thus making it a slow release relay. Contacts 522 close to place resistor R51 in parallel with capacitor C50, thereby providing an adjustment for changing the time constant of capacitor C50. The particular time constant of capacitor C50 is not material to the invention; however, it has been found that there are satisfactory results when resistor R51 is adjusted so that the release time for relay 580 is in the order of nine hundred milliseconds.

Wheatstone bridge WH6 is now connected to both tip and ring conductors T and R to test for leakage to ground, the circuit being traced from conductors T and R through contacts 696 and 622 (in parallel) to point WH65 on Wheatstone bridge WH6. Since many tests are made and many "faults" may be indicated, a description of "fault" registration is reserved until the end of the general description of a complete test cycle.

*Ground test.*—Means is provided for performing a plurality of tests in any desired sequence under the control of a chain of counting relays 220, 260 and 280. For the purposes of this description, the circuit is arranged to test the line first to determine whether either talking conductor has a fault connection to ground.

If a fault condition is indicated, the circuit operates as described below in a section entitled "Printing." If the line has higher than a predetermined resistance to ground, (i.e., no fault) contacts MA33 close and the circuit operates as described below in a section entitled "Trouble Free Indications." On the other hand, perhaps a "null" condition may be indicated wherein the Wheatstone bridge is in perfect balance and there is neither a "fault" nor a "no fault" indication. Therefore, contacts MA31–MA34 remain as shown in the drawing.

Means is provided for continuing the test in progress until the "null" condition subsides if it is going to subside. That is, after release of relay 520 and in turn its contacts 521, a period of time expires, after which capacitor C50 is sufficiently discharged so that null A slave relay 580 restores. Responsive thereto, the sequence of tests is advanced when contacts 581 close to operate advance relay 470 over a circuit which may be traced from (−) battery through the winding of relay 470, rest contacts 371, 581 and 694 to ground (+). Also responsive to the release of relay 580, contacts 181 close to complete a circuit for operating loop relay 220 to its first step over the circuit which may be traced from (−) battery through the upper winding of relay 220, rest contacts 225, 172, 181 and operated contacts 292 to ground (+).

Loop relay 220 operates to its first step, whereupon it closes only contacts 227 designated by the letter "X," thereby completing a shunt around its lower winding which may be traced from ground (+) on operated contacts 293 through contacts 227, the lower winding of relay 220, contacts 225, 172, 181, and 292 to ground (+).

Responsive to the operation of advance relay 470, contacts 671 open to disconnect magnetic amplifier MA3 from Wheatstone bridge WH6. Contacts 471 open to break the circuit which extends from master ground to contacts 334, thereby releasing null B relay 410 and null C relay 430.

Responsive to the restoration of null B relay 410, contacts 411 close and 412 open, thereby placing operating fault check relay 350 under control of discharging current emanating from capacitor C40. Variable resistor R4 has been preset to determine the length of the time period required to discharge capacitor C40 so that transistory conditions will not be registered as faults. Contacts 613 close to operate null A relay 520 over a circuit which may be traced from (−) battery through the winding of relay 520, contacts 613 and 692 to ground (+).

Responsive to the release of null C relay 430, contacts 631 close, thereby completing another path to null A relay 520. As pointed out above, fault check relay 350 is depending upon discharging current from capacitor C40 to hold it operated. In the absence of a fault condition, null A relay 520 operates during this discharging time interval.

Responsive to the operation of relay 520, contacts 522 open to remove a shunt from around capacitor C50 while contacts 521 close to operate null A slave relay 580 and to charge capacitor C50 over obvious circuits.

Responsive to operation of null A slave relay 580, contacts 581 open but have no immediate effect since relay 470 is slow release. Contacts 181 open to remove the shunt from around the lower winding of loop relay 220, thus causing it to operate to its second step and to advance the test sequence. In greater detail, prior to the opening of contacts 181, a shunt circuit was completed as explained above from ground (+) through operated contacts 292, rest contacts 181, 172, 225, the lower winding of loop relay 220, operated "X" or preliminary contacts 227, and operated contacts 293 to ground (+). When this shunt circuit is broken at contacts 181, loop relay 220 operates to its second step since both of its windings are energized in series over the circuit extending from (−) battery through the upper and lower windings of relay 220, operated contacts 227 and 293 to ground (+).

Thus far the description has been prepared under the assumption that the ground test indicated first a possible "null" condition, second the discharging current from capacitor C50 caused a time delay, and third a "fault" condition was not indicated after expiration of such time delay (or stated otherwise, the "null" condition continued). Further, it is contemplated that all of the preceding operations occur before capacitor C40 discharges sufficiently to restore fault check relay 350 which has remained operated. The circuit is now standing ready to perform the next in the sequence of tests.

*Loop Test.*—Means is provided for performing a "loop" test wherein the two line conductors are connected in series. Since the subscriber end of the line is open at hookswitch contacts, any current that flows over the line is a result of a short circuit between the tip and ring conductors T and R.

When loop relay 220 operates to its second step, contacts 221 open to extinguish lamp "Ground," thereby indicating that the ground test has been completed. "Loop" lamp (FIG. 1) lights to indicate that a loop test is in progress, the circuit extending from (−) battery through the filament of "Loop" lamp, rest contacts 141, operated contacts 222, 112, and 291 to ground (+). Contacts 223 and 224 operate, thereby switching marking conductors F1–F4 so that if a fault occurs during loop test, a different conductor is marked than would have been marked if a fault had occurred during the ground test. Contacts 225 and 226 close to prepare a circuit for operating battery relay 260 to its first step; however, nothing happens at this time since contacts 181 are now standing open. Contacts 621 and 622 operate to connect Wheatstone bridge WH6 for a loop test, i.e., a circuit may be traced from ground (+) through contact 666, operated contacts 621, conductor R, the line under test, a short circuit fault (if any), conductor T, operated contact 696 and a bifurcated circuit, one branch of which extends through point WH65, resistor WH61, and contact 668 to (—) battery and the other branch of which extends through rest contacts 532, operated contacts 695, rest contacts 682, contacts 671 (now open) and 664 to magnetic amplifier MA3.

After slow release advance relay 470 restores, contacts 671 and 471 close to make a loop test, i.e., the branch of the bifurcated circuit (just described) extending to the magnetic amplifier continues through contacts 671 (now closed), rest contacts 664, input winding 2 of magnetic amplifier MA3, rest contacts 662 and point WH66 to (—) battery via resistor WH62 and point WH67. Also responsive to release of relay 470, contacts 471 close, thereby completing a circuit which may be traced from master ground conductor MG through rest contacts 462, 471, 483, 334, MA32, 332 and the winding of null B relay 410 to (—) battery. Also, a parallel circuit may be traced from master ground conductor MG through contacts 462, 471, 483, 334, MA34, 336 and the winding of null C relay 430 to (—) battery.

Responsive to the operation of null B relay 410, contacts 411 open, thereby allowing capacitor C40 to charge over a circuit which may be traced from ground (+) through contacts 412, a resistance and capacitor C40, to (—) battery. Contacts 412 also hold relay 350 operated since it has not yet had time to release. Contacts 613 open, thus breaking one path to null A relay 520.

Responsive to the operation of null C relay 430, contacts 631 open, thus breaking a second path to null A relay 520 which releases. Contacts 632 have no effect since contacts 693 are now open.

Responsive to the restoration of null A relay 520, contacts 521 open, thereby breaking the circuit to null A slave relay 580 which continues to hold in an operated condition for a period of time that is determined by discharging current emanating from capacitor C50. Again, the delay caused by discharging current from capacitor C50 is provided to afford time for a possible "null" condition to stabilize.

Assuming that there is a low resistance "fault" that short circuits tip and ring conductors T and R, an indication is recorded as described later in a section entitled "Printing." On the other hand, if there is a "no fault" condition, the sequence of tests is advanced at a hight rate of speed as described below in the section entitled "Trouble-Free Indication." The following description assumes that a "null" condition exists.

Means is provided for delaying the advance of the sequence of tests responsive to indications of a "null" condition. In greater detail, assuming that Wheatstone bridge WH6 is balanced so that magnetic amplifier MA3 detects no current flow, relays 410 and 430 remain operated and contacts 613 and 631 remain open. After an interval measured by the time required for capacitor C50 to discharge, null A slave relay 580 restores.

Responsive to the restoration of null A slave relay 580, a circuit is completed from ground (+) on operated contacts 694 through rest contacts 581, 371, and the winding of advance relay 470 to (—) battery, causing it to operate. Contacts 181 close and a circuit may be traced for operating battery relay 260 to its first step, as follows: ground (+), operated contacts 292, rest contacts 181, 172, 226, 261, and the lower winding of battery relay 260 to (—) battery. When energized the lower winding only, battery relay 260 operates to its first step at which time "X" or preliminary contacts 263 are operated to shunt the upper winding of battery relay 260 over a circuit which may be traced from ground (+) through operated contacts 293, 263, the upper winding of battery relay 260, contacts 261, 226, 172, 181 and 292 to ground (+).

Responsive to the operation of advance relay 470, contacts 671 open, thereby disconnecting magnetic amplifier MA3 from the test circuits. Contacts 471 open to release null B relay 410 and null C relay 430 by opening the circuit which extends from master ground conductor MG through rest contacts 462, 471, 483, and 334, where the circuit divides, one branch going through contacts MA32, 332, and the winding of null B relay 410 to (—) battery and the other branch going through contacts MA34, 336 and the winding of null C relay 430 to (—) battery.

Responsive to the release of null B relay 410, contacts 412 open and contacts 411 close whereupon fault check relay 350 is held operated only by the discharging current extended from capacitor C40. Contacts 613 close thereby operating null A relay 520 over a circuit which may be traced from (—) battery through the winding of relay 520, rest contacts 613, operated contacts 692 and ground (+).

Responsive to restoration of null C relay 430, contacts 631 close, thus completing a second or alternate circuit to null A relay 520 which may be traced from (—) battery through the winding of relay 520, rest contacts 631, and operated contacts 692 to ground (+). Contacts 632 have no function at this time. Responsive to the reoperation of null A relay 520, contacts 521 close and 522 open, thereby reoperating null A slave relay 580 and charging capacitor C50.

Null A slave relay 580 opens contacts 181 and breaks the circuit in shunt with the upper winding of battery relay 260, thus causing it to operate to its second step and advance the sequence of tests. That is, after contacts 181 open, battery relay 260 operates to its second step over a circuit which may be traced from (—) battery through the lower and the upper windings of relay 260, operated contacts 263 and 293 to ground (+).

*Battery test.*—The sequence of tests is advanced to test tip and ring conductors T and R to determine whether any foreign battery may be connected thereto. The distant ends of conductors T and R terminate at subscriber line SL400 where a ringer may be coupled to the line via a gas tube, in which case there is no problem. Or, a ringer may be coupled to the line via a capacitor, in which case there may be an unstable condition resulting from a surge of current emanating from the discharging of such capacitor after relay 260 operates to its second step to complete the test circuit described above. If the line were tested during the surge of current, a foreign battery fault would be incorrectly detected; therefore, it is necessary to delay testing until after the surge has terminated and the line has stabilized if capacity coupled ringers are used. On the other hand, it would be a waste of time to delay testing if tube coupled ringers are used. Therefore, strap ST2 and capacitor C11 are provided to delay testing only when capacitor coupled ringers are provided, as explained below.

Certain foreign alternating currents on the line under test may also be recognized as "faults" if the foreign alternating currents are in phase with the magnetic amplifier A.C. supply. Detection of such foreign alternating currents occurs more frequently when the strap ST2 is used because the amplifier may be connected to a line when a foreign current is out-of-phase with the supply. The extended release time of ringer identification slave relay 440 (as explained below) allows more time for the third harmonic of the foreign current to become in phase with the supply.

Returning to the operation of battery relay 260 to its second step (as explained above), contacts 261 and 262 operate, thereby preparing a circuit for end-of-line test relay 280. Contacts 461 close to operate battery slave relay 340 over an obvious circuit. Contacts 462 open to break one of the circuits extending from master ground conductor MG to the magnetic amplifier contacts MA31–MA34. Since contacts 441 are also open at this time, the circuits controlled by contacts MA31–MA34 are rendered ineffective. Contacts 661–668 operate to advance the sequence of tests and to connect tip and ring conductors T and R, Wheatstone bridge WH6 and magnetic amplifier MA3 for a foreign battery or "FEMF" test over a circuit which may be traced as follows: from ground (+) through contacts 667, resistance WH61, contacts 665 and 621 to conductor R and in parallel therewith through contacts 667, resistance WH61, and contacts 696 to conductor T. No battery is intentionally connected to the line at this time; therefore, any current flow indicates an insulation fault.

Responsive to the operation of relay 340, contact 141 opens to extinguish the lamp designated "Loop" and contacts 142 close to light the lamp designated "FEMF" over a circuit which may be tracted from (−) battery through the filament of lamp "FEMF," operated contacts 142, 222, 112 and 291 to ground (+). Contacts 143 open and 144 close, thereby switching conductors F1–F4 so that if a fault is encountered during battery test, a distinctive indication thereof is recorded by the printer. Contacts 341 open, thereby releasing ringer identification relay 360.

Responsive to the restoration of ringer identification relay 360, contacts 161 close to connect capacitor C11 via strap ST2 (if provided) to ringer identification slave relay 440 and (−) battery, whereupon discharging current is utilized to make relay 440 a slow release relay. The adjustment of resistor R10 determines the discharge time required by capacitor C11 and therefore the length of the time period during which ringer identification slave relay 440 is held operated. During the interval while ringer identification slave relay 440 is being held operated by discharging current from capacitor C11, null B relay 410 and null C relay 430 remain disconnected from master ground conductor MG since contacts 441 are held open. Also, it is assumed that capacitor C40 has a time constant which is sufficient to hold fault check relay 350 in an operated condition during the discharging time of capacitor C11. Null A relay 520 and its slave 580 continue to be held in an operated condition since contacts 613 are closed.

Responsive to the release of relay 470 after expiration of its slow release time period following operation of relay 580, as explained above, the amplifier MA3 is connected from ground (+) through contacts 667, resistor WH61, contacts 532, 695, 682, 671, 661, winding 2 of magnetic amplifier MA3, contacts 663 and point WH66 on Wheatstone bridge WH6 to (−) battery at point WH67.

If there is a foreign battery "fault" or if there is a "no fault" condition on the line, it is detected by magnetic amplifier MA3. On the other hand, no current in winding 2 may indicate a "null" or true balanced condition. Assuming that there is a "null" condition, a circuit may be traced from master ground conductor MG through contacts 441 (after capacitor C11 discharges sufficiently to release relay 440) contacts 471, 483, 334 and in parallel circuits, one being through contacts MA32, 332 and the winding of null B relay 410 to (−) battery, and the other being through contacts MA34, 336 and the winding of null C relay 430 to (−) battery. Null B relay 410 and null C relay 430 operate to indicate a "null" condition.

Responsive to the operation of null B relay 410, contacts 412 close and 411 open, thereby energizing fault check relay 350 and recharging capacitor C40 over obvious circuits. It is assumed that relay 350 did not have time to release prior to the closure of contacts 412 just described. Also responsive to operation of relay 410, contacts 613 open to break one of the energizing circuits for null A relay 520.

Responsive to operation of null C relay 430, contacts 631 open, thereby breaking a second path to null A relay 520, which restores. Contacts 632 close but have no effect at this time.

Null A relay 520 restores and opens contacts 521 while closing contacts 522, thus placing null A slave relay 580 under the control of discharging current emanating from capacitor C50 for a period of time which is determined by the adjustment of resistor R51.

Responsive to the restoration of null A slave relay 580 following discharge of capacitor C50, contacts 181 close, thereby cmpleting a circuit for operating end-of-line-test relay 280 to its first step over a circuit which may be traced from (−) battery through the lower winding of relay 280, contacts 281, 262, 226, 172, 181 and 292 to ground (+). End-of-line-test relay 280 operates to its first step, thereby closing its "X" or preliminary contacts 282 and shunting its upper winding over a circuit which may be traced from ground (+) on contacts 293, through contacts 282, the upper winding of end-of-line-test relay 280, resting contacts 281, operated contacts 262, 226, resting contacts 172, 181 and operated contacts 292 to ground (+). The end-of-line-test relay 280 is adapted to remain on its first step when its upper winding is thus shunted. Also responsive to release of relay 580, contacts 581 close, thereby operating advance relay 470 over a circuit which may be traced from (−) battery through the winding of relay 470, rest contacts 371, 581 and operated contacts 694 to ground (+).

Responsive to operation of advance relay 470, contacts 471 open, thereby disconnecting null B relay 410 and null C relay 430 from master ground conductor MG. Contacts 671 open, thereby disconnecting magnetic amplifier MA3 from the line to terminate the battery test. When null B relay 410 restores, contacts 411 close and contacts 412 open to place fault check relay 350 under the control of discharging current extended from capacitor C40. Contacts 613 close to reoperate null A relay 520 over a circuit which may be traced from (−) battery through the winding of relay 520, rest contacts 613 and operated contacts 692 to ground (+).

Responsive to the operation of null A relay 520, contacts 522 open and 521 close, thereby operating null A slave relay 580 and charging capacitor C50 over obvious circuits.

Responsive to the operation of null A slave relay 580, contacts 181 open, thereby breaking the shunt circuit around the upper winding of relay 280 which formerly extended from ground (+) through contacts 292, 181, 172, 226, 262, 281, the upper winding of end-of-line-test relay 280, and contacts 282 and 293 to ground (+). Therefore, end-of-line-test relay 280 operates to its second step over a circuit which may be traced from (−) battery through the lower and upper windings of end-of-line-test relay 280, contacts 282 and 293 to ground (+). Contacts 581 also open responsive to operation of relay 580 to restore advance relay 470.

*End of Test*

After the last test in a cycle is completed, a signal is sent to test switch train ST400 for indicating that the next subscriber line should be seized. That is, when end-of-line test relay 280 operates to its second step, contacts 281 open to end the operating cycle of the two-step counting relays 220, 260 and 280. Contacts 483 open, thereby preventing reoperation of any and all relays controlled by magnetic amplifier MA3. Contacts 682 open, thus finally disconnecting magnetic amplifier MA3 from Wheatstone bridge WH6. Contacts 681 close and an end-of-test indication is extended to prior circuit PC400 over a path which may be traced from ground (+) through operated contacts 511, 681 and the test check conductor to relay SP which operates.

Responsive to the operation of relay SP (FIG. 4), any suitable means (not shown) controlled by contacts PC2 causes switch train ST400 to release or seize the next line which is to be tested, as required. Also responsive to the operation of relay SP, contacts PC1 open to release start-of-test relay 490.

The conductor designated "Test Check" is also used to test the accuracy with which a test switch train steps. That is, at the end of each test cycle contacts 681 close, as explained above, and a circuit is extended to relay TC which is adapted to operate only when the line routiner indicates a connection with a particular line. Responsive thereto a suitable recognition circuit returns a marking over conductor PT1 if the test switch train has in fact been directed to such particular line. Responsive thereto the printer makes a suitable record. If desired, the particular line may have marginal faults permanently connected thereto in order that the test circuit may be checked to determine if it is functioning properly. For further information, see a copending application Serial No. 742,801, filed June 18, 1958, by Messers. Pharis and Gatzert and assigned to the assignee of the present case.

Responsive to the restoration of start-of-test relay 490, contacts 291 open to disable all of the lamps since no test is in progress. Contacts 292 open without effect at this time. Contacts 293 open to restore counting relays 220, 260 and 280. Contacts 294 open to restore the fault register relay 370, if operated. Contacts 491 open to restore ringer identification relay 360, if operated. Contacts 692 open to restore null A relay 520 and in turn its slave relay 580, if operated. Contacts 694 open to restore advance relay 470, if operated. Contacts 695 further break the circuit extending between magnetic amplifier MA3 and Wheatstone bridge WH6. Contacts 696 open to disconnect conductor T from the Wheatstone bridge. The testing is now completed and nothing further happens until it is to test the next subscriber line.

*Printing*

A fault may be encountered during any of the tests that are conducted in a testing cycle—the circuit operations are the same. Assuming that there is a fault, magnetic amplifier MA3 closes contacts MA31 and opens contacts MA32, thus preparing a circuit for fault register relay 370 which does not operate since contacts 351 are open. After a period of time measured by discharging current from capacitor C40, fault check relay 350 releases to close contacts 351, whereupon fault register relay 370 operates and locks over its contacts 173.

Responsive to the operation of relay 370, contacts 571 and 572 operate and cause printer PR1 to print an identification of the line under test responsive to a control signal from identifier ID1. Next, printer PR1 makes a record of the particular fault encountered as indicated by markings on a particular one of the conductors F1–F4. Any suitable identifier ID1 may be used. For example, if a register sender is used to control the operation of the test switch train, the sender may be reoperated to transmit the line identification while the register holds its established position to "remember" the line under test.

In greater detail, it is assumed that a ground fault condition exists. As explained above, the ground test is conducted at a time when tip and ring conductors T and R are connected through contacts 696 and 622 in parallel to point WH65 on Wheatstone bridge WH6. Input winding 2 of amplifier MA3 is connected from ground through resistance WH63, point WH66, rest contacts 662, input winding 2, contacts 664, 671, 682, 695, 532, point WH65, resistance WH61, and resting contacts 668 to (−) battery.

Assuming that there is a fault condition, Wheatstone bridge WH6 is out of balance and current flows through input winding 2 of magnetic amplifier MA3 in a direction which indicates a fault. An amplified output current is induced in output winding 3 whereupon means (not shown) is provided for operating contacts MA31 and MA32 to indicate a fault condition. Fault register relay 370 is prepared over a circuit extending from (−) battery, through the winding of relay 370, contacts 351 (now open since fault check relay 350 is operated), contacts 331, MA31, 334, 483, 471, 441 and 462 (in parallel) to master ground conductor MG. The direction of current flow in output winding 3 of magnetic amplifier MA3 is such that contacts MA33 and MA34 remain in the position shown in the drawing; hence, null C relay 430 remains operated in parallel with relay 370. Since contacts MA32 are now open, null B relay 410 restores and contacts 412 open so that fault check relay 350 is held operated only by discharging current emanating from capacitor C40. Contacts 613 close to reoperate null A relay 520 over a circuit which may be traced from (−) battery through the winding of relay 520, contacts 613 and 692 to ground (+).

Null A relay 520 reoperates and closes contacts 521 while opening contacts 522, thereby holding null A slave relay 580 and charging capacitor C50 over obvious circuits. Discharging current from capacitor C50 has held null A slave relay 580 operated during the time while null A relay 520 may have been released. Contacts 581 have remained open and advance relay 470 has not operated to advance the sequence of tests.

Nothing further happens until capacitor C40 is discharged sufficiently to allow fault check relay 350 to restore.

The delay occasioned by the time required for discharge of capacitor C40 affords a sufficient interval to prevent the registration of a transitory condition as a "fault." For example, a charge stored on a capacitor might appear as a foreign battery, leak off during the interval and then the line would test good before relay 350 releases to complete the test.

Responsive to the restoration of fault check relay 350 after discharge of capacitor C40, contacts 351 close and fault register relay 370 operates over a circuit which may be traced from (−) battery through the winding of relay 370, contacts 351, 331, MA31, 334, 483, 471 and 462 to master ground conductor MG.

Responsive to the operation of fault register relay 370, a locking circuit is completed which may be traced from (−) battery through the winding of relay 370, operated contacts 173 and 294 to ground (+). Contacts 172 open to prevent further operation of the chain of counting relays 220, 260 and 280. It should be noted that as each of these three relays operates, it locks over its "X" contact so that it remains in its operated or unoperated state regardless of whether contacts 172 are opened or closed. Contacts 371 open to disable advance relay 470. Contacts 171 and 571 close while contacts 572 open, thereby transmitting a control signal to printer PR1 for causing it to print a code according to the markings appearing on conductors F1–F4.

Since it is assumed that there is a "ground" fault, contacts 171 close at a time when none of the counting relays 220, 260 and 280 are operated. Hence, printer PR1 prints a suitable code responsive to a marking which may be traced from printer PR1 over conductor F4, contacts 171, 223 and conductor F1 to printer PR1.

On loop faults, i.e., a leakage or short circuit between tip and ring conductors T and R fault register relay 370 operates and contacts 171 close at a time when loop relay 220 is operated and contacts 224 are closed. Thus, a circuit may be traced from conductor F4 through contacts 171, 224, 143 and conductor F2 to the printer.

If a fault is found during the battery test, relay 340 is operated as a slave of relay 260; therefore, the circuit to printer PR1 may be traced from conductor F4 through operated contacts 171, 224 and 144 to conductor F3.

In this manner, a printed record is made identifying each line that has a "fault" on it and the nature of such "fault." After printer PR1 has printed both the identification of the faulty line and the fault code, it transmits any suitable signal over conductor SP1 to the "Prior Circuit" PC400. Responsive thereto the next line is seized and the next cycle of tests is started, as explained above in the section entitled "End of Test."

Trouble-Free Indications

Means is provided for immediately advancing the sequence of tests when there is an indication on any test that the line is free of fault. For example, there is no need to allow a "null" condition to subside or to avoid registration of transitory conditions as faults. Fast advance is desirable wherever possible so that a ten thousand line office may be tested within a normal eight hour working day.

Assuming that a "no fault" condition is encountered, current flows in input winding 2 of magnetic amplifier MA3 in a direction which is opposite to that in which current flows if there is a fault. Responsive thereto, contacts MA31 and MA32 do not operate but contacts MA33 and MA34 do operate, thereby opening the circuit to release null C relay 430 and closing the circuit to operate fast advance relay 450. In greater detail, prior to the operation of contacts MA33 and MA34, a circuit could be traced from master ground conductor MG through rest contacts 441, 462, 471, 483, 334, MA34, 336 and the winding of null A relay 430 to (−) battery. After contacts MA33 open and MA34 close, the circuit may be traced from (−) battery through the winding of fast advance relay 450, rest contacts 338, MA33, 334, 483, 471, 441 and 462 and master ground conductor MG. Since contacts MA31 and MA32 do not operate responsive to a "no fault" indication, null B relay 410 remains in an operating condition.

Responsive to the restoration of null C relay 430, contacts 631 close, thereby reoperating null A relay 520 over the circuit which may be traced from (−) battery through the winding of null A relay 520, rest contact 631 and operated contacts 692 to ground (+). It should be noted that null A slave relay 580 is held operated by discharging current from capacitor C50 and that relay 520 reoperates within the period allowed; therefore, null A slave relay 580 does not restore when a test indicates "no fault."

Responsive to the operation of fast advance relay 450, contacts 251 close, thereby completing a circuit to the chain of counting relays 220, 260 and 280 whereupon the sequence of tests is advanced.

Also responsive to the operation of fast advance relay 450, contacts 451 close for operating advance relay 470 over a circuit which may be traced from (−) battery through the winding of relay 470, rest contacts 371, and 451 to ground (+). The circuit now operates to make the next test in the sequence, as described above.

For example, if the line is found to be free from a ground fault, a circuit may be traced from ground (+) through contacts 251, 172, 225 and the upper winding of loop relay 220 to (−) battery. Thereafter, the next test is conducted in the manner explained above. Similarly, if there is "no fault" after a loop test, the circuit to the chain of counting relays 220, 260 and 280 is completed from ground (+) on operated contact 251 through contacts 172, 226 and 261 to battery relay 260 and (−) battery via its lower winding. Again the circuit functions in the manner explained above.

Calibration of Magnetic Amplifier

The magnetic amplifier MA3 is connected to indicate an unbalanced Wheatstone bridge. Therefore, it is desirable to provide means for calibrating the Wheatstone bridge to insure its balance under normal conditions.

To calibrate the bridge, first operate the key designated "CAL." Responsive thereto, contacts "CAL 31" close an obvious circuit for operating calibrate relay 330. A busy ground marking is sent from contacts "CAL 32" over conductor "CAL" to mark the test circuit of FIGS. 1–6 as busy in any suitable manner (not shown). Also, start relay 100 operates over an obvious circuit extending from contacts "CAL 32," thus connecting the A.C. supply to energize the circuit.

Responsive to the operation of calibrate relay 330, contacts 331–337 operate to disconnect various relays from the control of magnetic amplifier MA3 and to connect the calibration lamps marked "CAL 1" and "CAL 2" in lieu thereof. Contacts 531–533 close to substitute resistance WH64 for the subscriber line connections that are normally used during testing. Contacts 534 and 535 close to shunt part of resistance WH64, thereby providing for a fine adjustment, as required.

At this time, the test circuit may be traced from ground (+) on rest contacts 552 through contacts 534, part of resistor WH64, contacts 533, 682, 671, 664, input winding 2 of magnetic amplifier MA3, contacts 262, resistor WH62, and point WH67 to (−) battery.

The various resistances in the Wheatstone bridge may be adjusted to provide a balanced condition. If the bridge is not in calibration, one of the lamps "CAL 1" or "CAL 2" lights and the other is unlit. A proper adjustment of the various resistances making up the Wheatstone bridge WH6 results in both the lamps being lit simultaneously.

Miscellaneous

It should be noted that the test circuit provides means for advancing the sequence of tests after either a fast or slow time interval depending upon the outcome of the test. If there is "no fault," the test sequence is advanced immediately under the influence of fast advance relay 450. If a "fault" is indicated, a time interval is measured by the discharging current from capacitor C40 to avoid registering a temporary condition as a fault. If the test indicates a "null" condition, a time delay period is provided by discharging current from capacitor C50. If a line having capacity coupled ringers is tested, capacitor C11 discharges to provide time enough to stabilize any charge stored in the line inclusive of bridging attachments.

While a specific embodiment of the invention has been described, other modifications may readily occur to those skilled in the art. Therefore, the invention is not to be limited to the specific arrangement that is shown and described. The appended claims are intended to cover all modifications that may fall within the true spirit and scope of the invention.

What is claimed is:

1. A device for testing electrical circuits comprising means operative to "no fault," "null" and "fault" conditions in the course of making each of a plurality of tests to determine if the various electrical characteristics of each of said electrical circuits is above, equal to or below a predetermined value, means operative for making said testing means cyclically conducting each of said tests in a pre-established sequence, means for immediately advancing said sequence of testing to make the next of said tests when a "no fault" condition is indicated, means for delaying the advance of said sequence of testing for a predetermined time period when a "null" condition is indicated, means effective during said predetermined time period for continuing the test in progress when said "null" condition was detected, means effective after expiration of said predetermined time period for advancing said sequence of testing to make the next of said tests, and means for delaying the advance of said sequence of testing for a particular time period when a "fault" condition is indicated, whereby transitory conditions may subside prior to the final determination of test results on detection of said "fault" conditions.

2. The device of claim 1 wherein at least some of said electrical circuits to be tested include capacitors, means for identifying said circuits including capacitors, and means responsive to said identifying means for introducing a time delay whereby said capacitors may be discharged to a point of stabilization before at least one of said plurality of tests is conducted.

3. A device for testing electrical circuits comprising; means operative to "no fault," "null" and "fault" conditions in the course of making each of a plurality of tests to determine if various electrical characteristics of each of said electrical circuits is above, equal to or below a predetermined value, means operative for making said testing means cyclically conduct each of said tests in a pre-established sequence, means for indicating the results of each of said tests, means for immediately advancing said sequence of tests to make the next of said tests when a "no fault" condition is indicated, means for delaying the advance of said sequence of testing for a predetermined time period when a "null" condition is indicated, means effective during said predetermined time period for continuing the test in progress when said "null" condition was detected, means effective after expiration of said predetermined time period for advancing said sequence of testing to make the next of said tests, means for delaying the advance of said sequence of testing for a particular time period when a "fault" condition is indicated, whereby transitory conditions may subside prior to the final determination of test results when "fault" conditions are detected, and means for making a record of said test results responsive to continued indications of fault conditions after expiration of said particular time period.

4. A device for testing electrical circuits comprising; means operative to "no fault," "null" and "fault" conditions in the course of making each of a plurality of tests to determine if various electrical characteristics of each of said electrical circuits is above, equal to or below a predetermined value, means operative for making said testing means cyclically conduct each of said tests in a pre-established sequence, means for indicating the results of each of said tests, means for immediately advancing said sequence of testing to make the next of said tests when a "no fault" condition is indicated, means for delaying the advance of said sequence of testing for a predetermined period of time when a "null" condition is indicated, means for continuing the test in progress when said "null" condition was detected for said predetermined time period to allow time for said "null" condition to subside, means for advancing said sequence of testing to make the next of said tests after said predetermined time period, means for delaying the advance of said sequence of testing for a particular time period when a "fault" condition is indicated, whereby transitory conditions may subside prior to the final determination of test results when "fault" conditions are detected, means for making a record of said "fault" conditions after said particular time period, and means for causing said test device to repeat said sequence of tests on the next of said electrical circuits.

5. The device of claim 4 wherein at least some of said electrical circuits to be tested include means which are capactively coupled thereto, means for identifying coupled circuits including capacitively coupled means, and means responsive to said identifying means for introducing a time delay whereby said coupling capacitors may be at least partially discharged before at least one of said plurality of tests is conducted.

6. A telephone system comprising a plurality of subscriber lines, switch means for automatically seizing each of said lines in a particular order, means effective after each of said lines is seized for cyclically conducting in a pre-established sequence a plurality of tests to determine if various electrical characteristics of said seized line is above, equal to or below a predetermined value, means operative to "no fault," "null" and "fault" conditions for indicating the results of each of said tests, means for immediately advancing said sequence of tests to make the next of said tests when a "no fault" condition is indicated, means for delaying the advance of said sequence of tests for a predetermined time period when a "null" condition is indicated, means effective during said predetermined time period for continuing the test in progress when said "null" condition was detected, means effective after expiration of said predetermined time period for advancing said sequence of tests to make the next of said tests, means for delaying the advance of said sequence of tests for a particular time period when a "fault" condition is indicated, whereby transitory conditions may subside prior to the final determination of test results detected on "fault" conditions, means for making a record of said test results responsive to a continued indication of a "fault" condition after expiration of said particular time period, means for releasing the line under test at the conclusion of a cycle of said plurality of tests, and means for causing said switch means to seize the next of said subscriber lines in said particular order, whereby said cycle of tests is conducted on each of said plurality of subscriber lines.

7. The telephone system of claim 6 wherein at least some of said subscriber lines serve substations having ringers which are capacitively coupled to said subscriber lines, means for identifying subscriber lines having capacity coupled ringers, and means responsive to said identifying means for introducing a time delay whereby said coupling capacitors may be discharged to a point where said line is stabilized after seizure and before at least one of said tests.

8. A telephone system comprising a plurality of subscriber lines, switch means for automatically seizing each of said lines in a particular order, means including a Wheatstone bridge operative to "no fault" and "fault" unbalanced conditions and to a "null" or balanced condition after each of said lines is seized for cyclically conducting in a pre-established sequence a plurality of tests on each of said subscriber lines, means including a magnetic amplifier connected to detect currents resulting from unbalanced conditions in said bridge for indicating the results of each of said tests, means for immediately advancing said sequence of tests responsive to currents in said magnetic amplifier indicating "no fault" conditions, means for delaying the advance of said sequence of tests for a predetermined time period responsive to no current flowing in said magnetic amplifier thereby indicating a "null" condition, means for continuing a test in progress during said predetermined time period, whereby time is provided for said bridge to become unbalanced if a true balance does not exist, means for delaying the advance of said sequence of tests for a particular time period responsive to currents in said magnetic amplifier indicating "fault" conditions whereby transitory conditions may subside prior to the final determination of test results on faulty lines.

9. A telephone system comprising a plurality of subscriber lines, switch means for automatically seizing each of said lines in a particular order, means including a Wheatstone bridge operative to "no fault" and "fault" unbalanced conditions and to a "null" or balanced condition for conducting a plurality of tests on each of said subscriber lines, means for successively connecting said bridge to individual subscriber lines to conduct a cycle comprising each of said tests in a pre-established sequence, means including a magnetic amplifier connected to detect currents resulting from unbalanced bridge conditions for indicating the results of each of said tests, means for immediately advancing said sequence of tests to make the next of said tests responsive to currents in said magnetic amplifier indicating "no fault" conditions, means for delaying the advance of said sequence of tests for a predetermined time period responsive to no currents flowing in said magnetic amplifier thus indicating "null" conditions, means for continuing a test in progress during said predetermined time period, whereby time is provided for said bridge to become unbalanced if a "null" condition does not exist in fact, means for delaying the advance of said sequence of tests for a particular time period responsive to currents in said magnetic amplifier indicating "fault" conditions, whereby transitory conditions may subside prior to the final determination of test results on faulty lines, and means for making a record of said "fault" condition and an identification of said subscriber line under test when said "fault" condition is detected.

10. The telephone system of claim 9 wherein at least some of said subscriber lines serve substations having ringers which are capacitively coupled to said subscriber lines, means for identifying said subscriber lines having capacity coupled ringers, and means responsive to said identifying means for introducing a time delay whereby said coupling capacitors may be discharged to a point where said line is stabilized with reference to the polarity of said bridge circuit after seizure and before at least one of said tests.

References Cited in the file of this patent

UNITED STATES PATENTS

| | | |
|---|---|---|
| 2,266,503 | Long | Dec. 16, 1941 |
| 2,301,837 | Wiley | Nov. 10, 1942 |
| 2,721,910 | Avery | Oct. 25, 1955 |